(12) United States Patent
Haryu et al.

(10) Patent No.: US 8,691,060 B2
(45) Date of Patent: Apr. 8, 2014

(54) WATER ELECTROLYSIS APPARATUS

(75) Inventors: Eiji Haryu, Utsunomiya (JP); Koji Nakazawa, Utsunomiya (JP); Masanori Okabe, Nerima-ku (JP); Kenji Taruya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 522 days.

(21) Appl. No.: 12/963,291

(22) Filed: Dec. 8, 2010

(65) Prior Publication Data
US 2011/0132748 A1 Jun. 9, 2011

(30) Foreign Application Priority Data

Dec. 8, 2009 (JP) .................................. 2009-278524
Dec. 21, 2009 (JP) .................................. 2009-288944

(51) Int. Cl.
*C25B 9/00* (2006.01)
*H01M 8/00* (2006.01)
*H01M 8/04* (2006.01)

(52) U.S. Cl.
USPC ........... 204/257; 204/193; 204/194; 204/242; 429/456; 429/457

(58) Field of Classification Search
USPC ........................... 204/242, 257; 429/456, 457
See application file for complete search history.

(56) References Cited

U.S. PATENT DOCUMENTS 8,349,151 B2 * 1/2013 Schmitt et al. ................ 204/257

FOREIGN PATENT DOCUMENTS

JP 9-95791 4/1997

* cited by examiner

*Primary Examiner* — Harry D Wilkins, III
*Assistant Examiner* — Zulmariam Mendez
(74) *Attorney, Agent, or Firm* — Nelson Mullins Riley & Scarborough LLP; Anthony A. Laurentano

(57) ABSTRACT

A water electrolysis apparatus includes an anode separator having a water flow field held in fluid communication with a water supply passage and a discharge passage. The water flow field includes a plurality of water channels, an arcuate inlet buffer, and an arcuate outlet buffer. The water channels have respective ends connected to the arcuate inlet buffer through respective inlet joint channels. The inlet joint channels are oriented at an angle of 90 degrees or greater with respect to respective tangential lines at the ends of the inlet joint channels which are connected to the arcuate inlet buffer.

9 Claims, 13 Drawing Sheets

US 8,691,060 B2

WATER ELECTROLYSIS APPARATUS

CROSS-REFERENCE TO RELATED APPLICATION

This application is based upon and claims the benefit of priority from Japanese Patent Applications No. 2009-278524 filed on Dec. 8, 2009 and No. 2009-288944 filed on Dec. 21, 2009, of which the contents are incorporated herein by reference.

BACKGROUND OF THE INVENTION

1. Field of the Invention

The present invention relates to a water electrolysis apparatus including an electrolyte membrane, circular current collectors disposed on the respective opposite sides of the electrolyte membrane, and separators stacked on the current collectors, wherein a water flow field for supplying water is defined between one of the current collectors and one of the separators and a hydrogen flow field for producing hydrogen by electrolyzing the water is defined between the other of the current collectors and the other of the separators.

2. Description of the Related Art

Solid polymer electrolyte fuel cells generate DC electric energy when anodes thereof are supplied with a fuel gas, i.e., a gas mainly composed of hydrogen, e.g., a hydrogen gas, and cathodes thereof are supplied with an oxygen-containing gas, a gas mainly composed of oxygen, e.g., air.

Generally, water electrolysis apparatus (electrochemical apparatus) are used to generate a hydrogen gas for use as a fuel gas for such solid polymer electrolyte fuel cells. The water electrolysis apparatus employ a solid polymer electrolyte membrane for decomposing water to generate hydrogen (and oxygen). Electrode catalyst layers are disposed on the respective sides of the solid polymer electrolyte membrane, making up a membrane electrode assembly. Current collectors are disposed on the respective opposite sides of the membrane electrode assembly, making up a unit. The unit is essentially similar in structure to the fuel cells described above.

A plurality of such units are stacked, and a voltage is applied across the stack while water is supplied to the current collectors on the anode side. On the anodes of the membrane electrode assemblies, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen is discharged with excess water from the units.

Japanese Laid-Open Patent Publication No. 09-095791 discloses a water electrolysis apparatus of the type described above. As shown in FIG. 13 of the accompanying drawings, the disclosed water electrolysis apparatus includes a cell 2 comprising a solid polymer electrolyte membrane sandwiched between a disk-shaped anode feeder plate 1 and a disk-shaped cathode feeder plate. A plurality of such cells 2 are stacked with separator plates interposed therebetween. The anode feeder plate 1 is fitted in a casing ring 3.

The anode feeder plate 1 has a plurality of parallel grooves 4 defined in a surface thereof that is not held in contact with the solid polymer electrolyte membrane. Each of the grooves 4 serves as a flow field for pure water and also as a flow field for a generated oxygen-containing gas to flow therethrough. The casing ring 3 has a circumferential groove 5 defined in an inner circumferential surface thereof and held in fluid communication with the grooves 4. The casing ring 3 also has three through holes 6a, 6b, 6c defined therein which extend along the direction in which the cells 2 are stacked.

The through hole 6a, which serves to supply pure water, and the circumferential groove 5 are connected to each other by a passage 7a defined in the casing ring 3 therebetween. The through hole 6b, which serves to discharge pure water and an oxygen gas, and the circumferential groove 5 are connected to each other by a passage 7b defined in the casing ring 3 therebetween. The through hole 6c, which serves to discharge a hydrogen gas, is disposed closely to the through hole 6b. Hydrogen which is generated at the cathode feeder plate by electrolysis of water is introduced into the through hole 6c.

Pure water is supplied from the through hole 6a via the passage 7a to the circumferential groove 5. When the pure water is distributed into the grooves 4, it needs to travel the grooves 4 over different distances from the through hole 6a to the grooves 4. The grooves 4 are spaced from the through hole 6b by different distances. The sum of the distance from the through hole 6a to each groove 4 and the distance from each groove 4 to the through hole 6b is different from groove 4 to groove 4. For example, the sum of those distances is minimum with respect to the groove 4 which is closest to the through holes 6a, 6b.

Consequently, a wide range of different pressure losses is caused by passageways extending between the through holes 6a, 6b and the grooves 4, tending to lower the ability to distribute pure water equally into the grooves 4. The distributed pure water thus flows at widely different rates through the grooves 4, so that the water electrolyzing process is not performed efficiently.

When pure water supplied from the through hole 6a via the passage 7a to the circumferential groove 5 is distributed into the grooves 4, it suffers the minimum pressure loss in the central groove 4 which is closest to the through hole 6a.

Therefore, the pure water finds its way most easily, or with the minimum pressure loss, into the central groove 4. Those grooves 4 which are disposed next to the central grooves 4 impose a higher pressure loss on the distributed pure water because the pure water is introduced into the grooves 4 at a much sharper angle of approach from the circumferential groove 5. Therefore, the ability to distribute pure water equally into the grooves 4 tends to be lowered, and the distributed pure water flows at widely different rates through the grooves 4, so that the water electrolyzing process is not performed efficiently.

SUMMARY OF THE INVENTION

It is an object of the present invention to provide a water electrolysis apparatus which is capable of distributing water equally into water channels and supplying water uniformly and reliably to a water flow field for an efficient water electrolyzing process.

According to the present invention, there is provided a water electrolysis apparatus comprising an electrolyte membrane, a pair of circular current collectors disposed respectively on opposite sides of the electrolyte membrane, and a pair of separators stacked respectively on the circular current collectors, wherein a water flow field for supplying water is defined between one of the circular current collectors and one of the separators and a hydrogen flow field for producing hydrogen through electrolysis of the water is defined between the other circular current collector and the other separator.

The water electrolysis apparatus also includes a water supply passage extending along a stacked direction in which the separators are stacked, for supplying the water to the water flow field, and a discharge passage extending along the stacked direction, for discharging a remaining amount of the water from the water flow field.

The water flow field includes a plurality of water channels extending along a plane of the circular current collector across an imaginary straight line which interconnects the water supply passage and the discharge passage, and disposed parallel to each other in the plane of the circular current collector, an arcuate inlet buffer extending around the circular current collector and held in fluid communication with the water supply passage, and a plurality of inlet joint channels interconnecting the water channels and the arcuate inlet buffer. The inlet joint channels are oriented at an angle of 90 degrees or greater with respect to respective tangential lines at the ends of the inlet joint channels which are connected to the arcuate inlet buffer.

Alternatively, the water flow field includes a plurality of water channels extending along a plane of the circular current collector across an imaginary straight line which interconnects the water supply passage and the discharge passage, and disposed parallel to each other in the plane of the circular current collector, an arcuate inlet buffer extending around the circular current collector and held in fluid communication with the water supply passage, and a plurality of bent inlet joint channels interconnecting the water channels and the arcuate inlet buffer.

The inlet joint channels are oriented at respective different angles with respect to respective tangential lines at the ends of the inlet joint channels which are connected to the arcuate inlet buffer, the different angles being progressively greater along directions from a central one of the inlet joint channels toward outermost ones of the inlet joint channels.

According to the present invention, the water flow field includes the water channels which extend along the plane of the circular current collector across the imaginary straight line which interconnects the water supply passage and the discharge passage. The distance from the water supply passage to one of the inlet joint passages and the distance from a corresponding one of the outlet joint passages to the discharge passage, which are correlated via a corresponding one of the water channels, are complementary to each other, so that as the distance from the water supply passage is smaller, the distance to the discharge passage is longer. Accordingly, the differences between the pressure losses caused by the water channels are reduced advantageously.

Furthermore, the inlet joint channels connected to the respective water channels are oriented at the angle of 90 degrees or greater with respect to the respective tangential lines at the ends of the inlet joint channels which are connected to the arcuate inlet buffer. Accordingly, the angle of approach at which water is introduced from the arcuate inlet buffer into the inlet joint channels is large enough to reduce pressure losses caused when water is branched into the inlet joint channels.

Therefore, the pressure losses posed on water as it is branched into the inlet joint channels are reduced, thereby making it possible to distribute water uniformly to the water channels. Consequently, the entire water flow field can be uniformly and reliably supplied with water for an efficient water electrolyzing process.

According to the present invention, moreover, the water flow field includes the bent inlet joint channels interconnecting the water channels and the arcuate inlet buffer. The inlet joint channels are oriented at the respective different angles with respect to the respective tangential lines at the ends of the inlet joint channels which are connected to the arcuate inlet buffer, the different angles being progressively greater along directions from the central inlet joint channel toward the outermost inlet joint channels.

Therefore, the pressure losses caused when water is distributed from the arcuate inlet buffer to the inlet joint channels are reduced. Particularly, water is prevented from flowing preferentially into those central inlet joint channels which are positioned near the water supply passage. The differences between the pressure losses caused in the water channels are reduced advantageously, thereby making it possible to distribute water uniformly to the water channels. Consequently, the entire water flow field can be uniformly and reliably supplied with water for an efficient water electrolyzing process.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
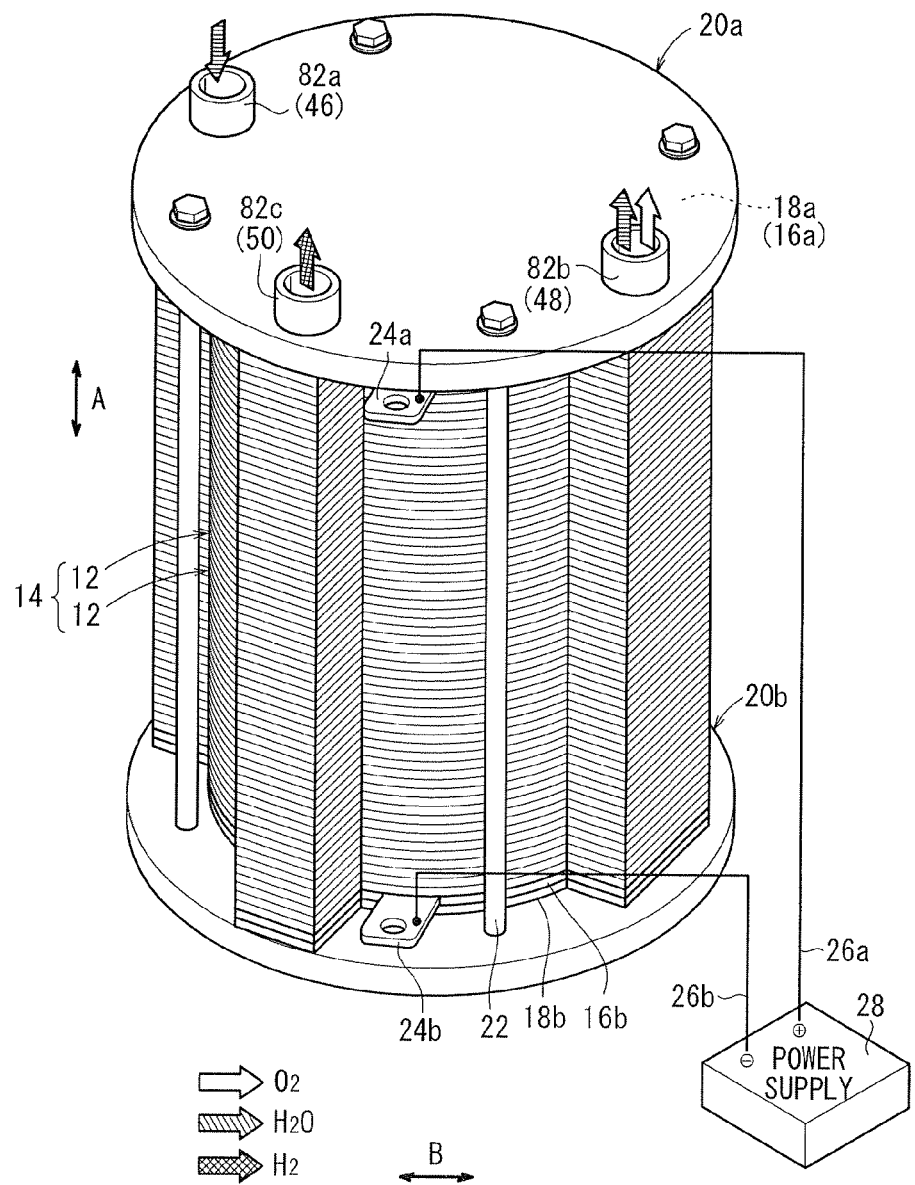
FIG. 1 is a perspective view of a water electrolysis apparatus according to a first embodiment of the present invention.
Figure 2:
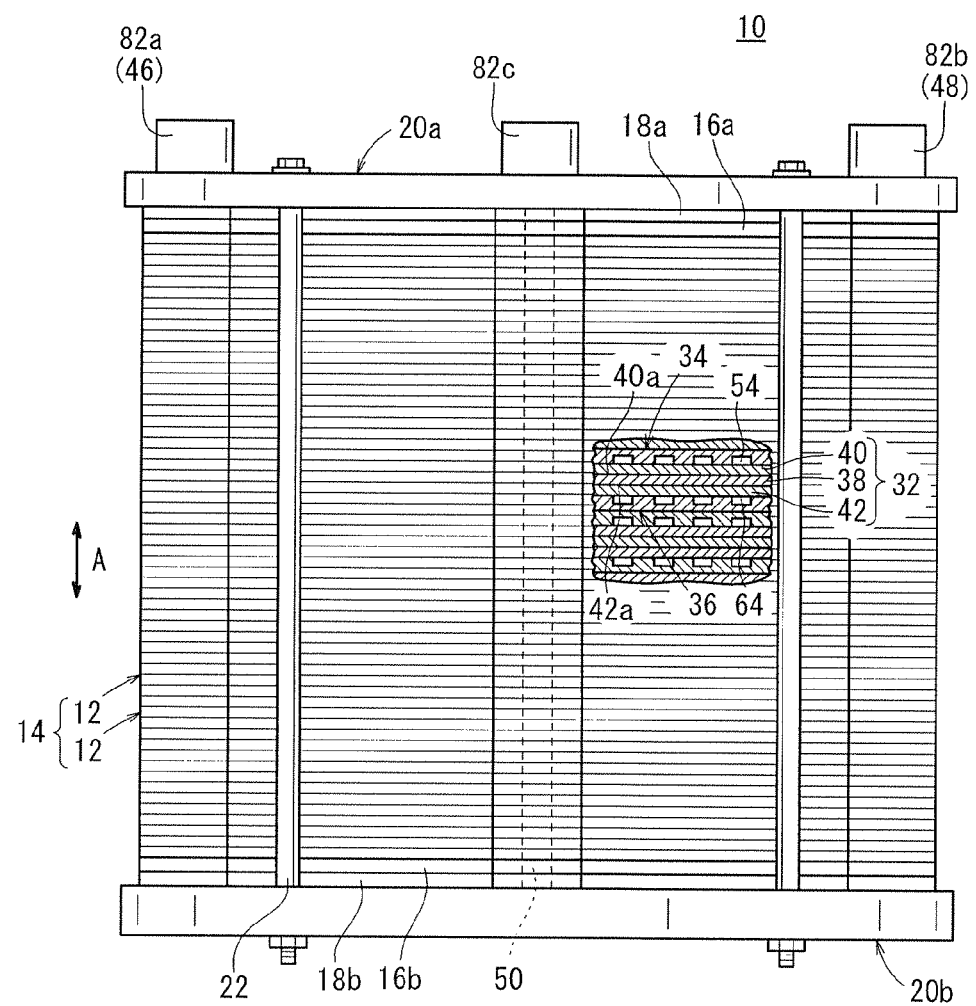
FIG. 2 is a side elevational view, partly in cross section, of the water electrolysis apparatus shown in FIG. 1.

As shown in FIGS. 1 and 2, a water electrolysis apparatus 10 as an electrochemical apparatus according to a first embodiment of the present invention serves as a high-pressure hydrogen manufacturing apparatus, and includes a stack assembly 14 comprising a plurality of unit cells 12 stacked in a vertical direction indicated by the arrow A. The unit cells 12 may be stacked in a horizontal direction indicated by the arrow B. The water electrolysis apparatus 10 also includes a terminal plate 16a, an insulating plate 18a, and an end plate 20a which are mounted on an upper end of the stack assembly 14 upwardly in the order named, and a terminal plate 16b, an insulating plate 18b, and an end plate 20b which are mounted on a lower end of the stack assembly 14 downwardly in the order named. The unit cells 12, the terminal plates 16a, 16b, the insulating plates 18a, 18b, and the end plates 20a, 20b are of a disk shape.

The stack assembly 14, the terminal plates 16a, 16b, and the insulating plates 18a, 18b are fastened integrally together by the end plates 20a, 20b that are interconnected by four tie rods 22 extending in the directions indicated by the arrow A between the end plates 20a, 20b. The four tie rods 22 are angularly equally spaced around the centers of the end plates 20a, 20b.

Alternatively, the stack assembly 14, the terminal plates 16a, 16b, and the insulating plates 18a, 18b may be integrally held together in a box-like casing, not shown, which includes the end plates 20a, 20b as end walls. The water electrolysis apparatus 10 is illustrated as being of a substantially cylindrical shape.

As shown in FIG. 1, terminals 24a, 24b project radially outwardly from respective side edges of the terminal plates 16a, 16b. The terminals 24a, 24b are electrically connected to a power supply 28 by electric wires 26a, 26b, respectively. The terminal 24a, which is an anode terminal, is connected to the positive terminal of the power supply 28, and the terminal 24b, which is a cathode terminal, is connected to the negative terminal of the power supply 28.

Figure 3:
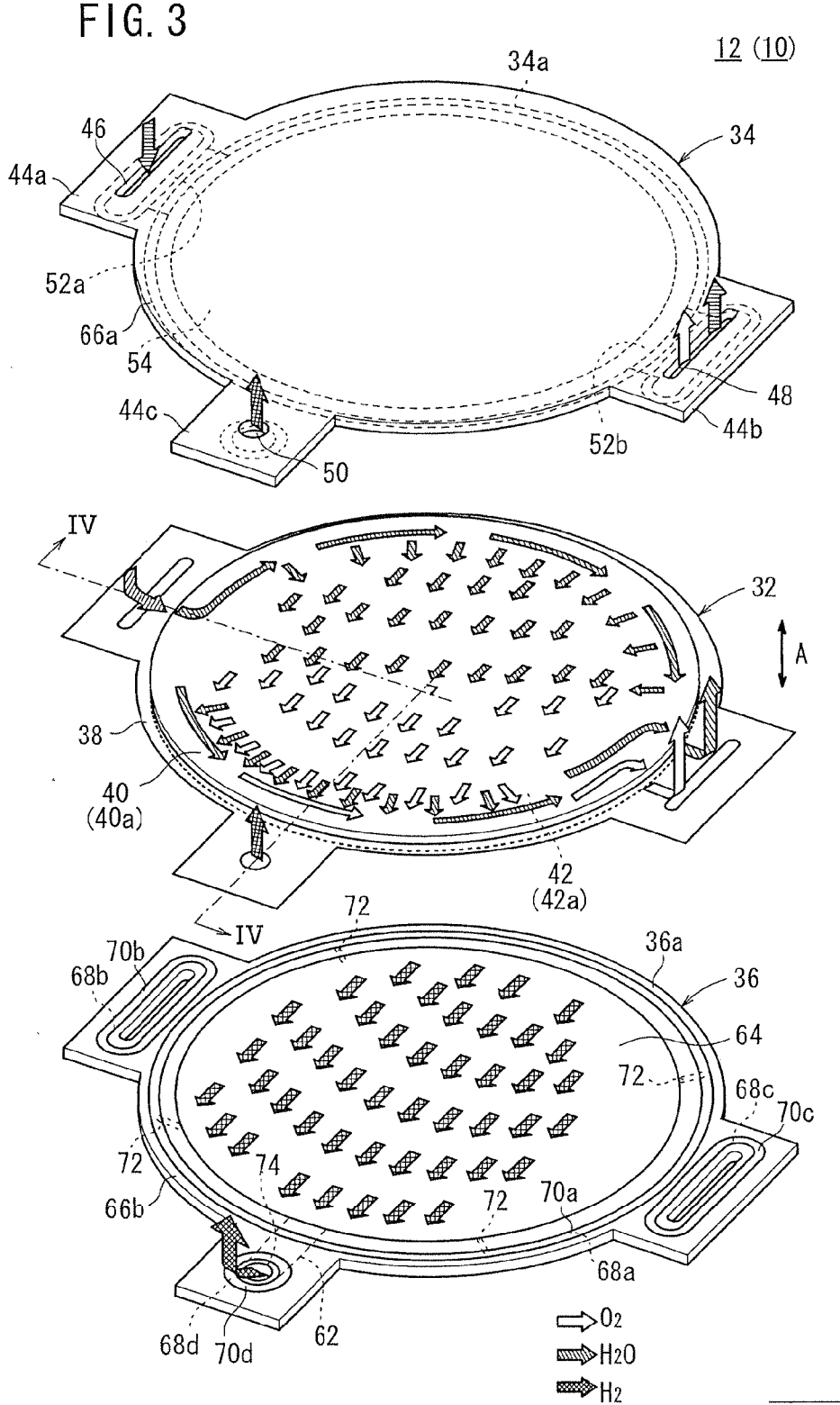
FIG. 3 is an exploded perspective view of a unit cell of the water electrolysis apparatus.

As shown in FIGS. 2 and 3, each of the unit cells 12 comprises a substantially disk-shaped membrane electrode assembly 32, and an anode separator 34 and a cathode separator 36 which sandwich the membrane electrode assembly 32 therebetween. Each of the anode separator 34 and the cathode separator 36 is of a substantial disk shape and is in the form of a carbon plate, or in the form of a metal plate such as a steel plate, a stainless steel plate, a titanium plate, an aluminum plate, or a plated steel plate. Alternatively, each of the separators 34, 36 is formed by performing anti-corrosion treatment on the surface of such a metal plate and thereafter pressing the metal plate into shape, or by cutting the metal plate into shape and thereafter performing anti-corrosion treatment on the surface of the cut metal plate.

The membrane electrode assembly 32 has a solid polymer electrolyte membrane 38 comprising a thin membrane of perfluorosulfonic acid which is impregnated with water, and a circular anode current collector 40 and a circular cathode current collector 42 which are disposed respectively on the opposite surfaces of the solid polymer electrolyte membrane 38. The solid polymer electrolyte membrane 38 has a peripheral edge projecting radially outwardly from the outer circumferential edges of the anode current collector 40 and the cathode current collector 42.

An anode catalyst layer 40a and a cathode catalyst layer 42a are formed on the opposite surfaces of the solid polymer electrolyte membrane 38, respectively. The anode catalyst layer 40a is made of a Ru (ruthenium)-based catalyst, for example, and the cathode catalyst layer 42a is made of a platinum catalyst, for example.

Each of the anode current collector 40 and the cathode current collector 42 is made of a sintered spherical atomized titanium powder (porous electrically conductive material), and has a smooth surface area which is etched after it is cut to shape. Each of the anode current collector 40 and the cathode current collector 42 has a porosity in the range of 10% through 50%, or more preferably in the range from 20% through 40%.

As shown in FIG. 3, each unit cell 12 has a first projection 44a, a second projection 44b, and a third projection 44c which project radially outwardly from its outer circumferential edge in the plane of the separators. The first projection 44a has a water supply passage 46 defined therein. The water supply passages 46 of the unit cells 12 are held in fluid communication with each other along the stacked direction indicated by the arrow A, and serve to supply water (pure water) as a first fluid.

The second projection 44b has a discharge passage 48 defined therein. The discharge passages 48 of the unit cells 12 are held in fluid communication with each other along the stacked direction indicated by the arrow A, and serve to discharge oxygen generated by an electrochemical reaction and water that has been used. The third projection 44c has a hydrogen passage 50 defined therein. The hydrogen passages 50 of the unit cells 12 are held in fluid communication with each other along the stacked direction indicated by the arrow A, and serve to pass hydrogen generated as a second fluid by an electrochemical reaction therethrough. The water supply passage 46 and the discharge passage 48 are of an oblong cross-sectional shape and are positioned symmetrically with respect to the center of the unit cell 12, i.e., diametrically across the unit cell 12.

Figure 4:
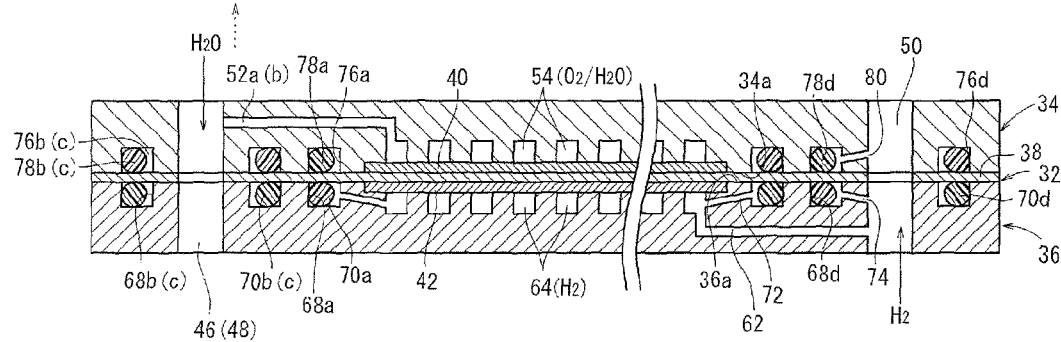
FIG. 4 is a fragmentary cross-sectional view of the unit cell, taken along line IV-IV of FIG. 3.

As shown in FIGS. 3 and 4, the anode separator 34 has a supply channel 52a defined in an outer circumferential edge portion thereof in fluid communication with the water supply passage 46 and a discharge channel 52b defined in an outer circumferential edge portion thereof in fluid communication with the discharge passage 48. The anode separator 34 also has a water flow field 54 defined in a surface 34a thereof which faces the membrane electrode assembly 32 and held in fluid communication with the supply channel 52a and the discharge channel 52b.

Figure 5:
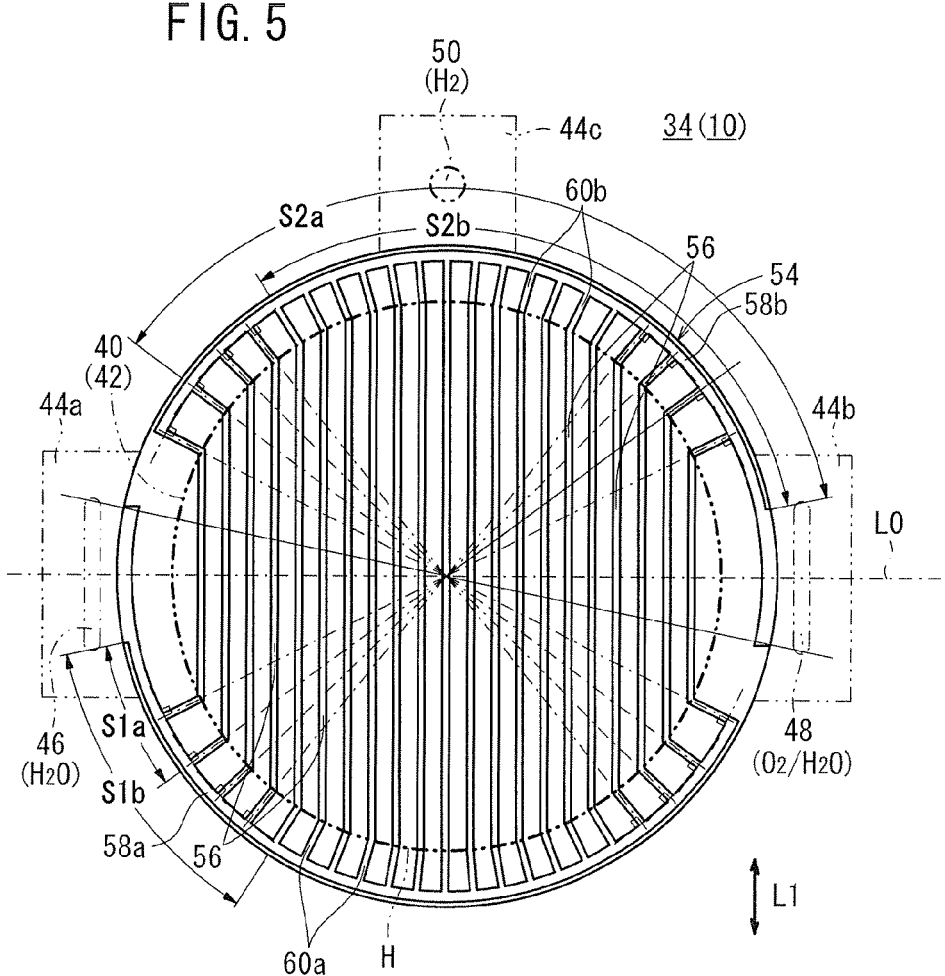
FIG. 5 is a plan view of an anode separator of the unit cell.

As shown in FIG. 5, the water flow field 54 comprises a plurality of water channels 56 extending along the plane of the anode current collector 40 in the direction indicated by the arrow L1 across an imaginary diametrical straight line (central line) L0 which interconnects the water supply passage 46 and the discharge passage 48 and disposed parallel to each other within the plane H of the anode current collector 40, an arcuate inlet buffer 58a extending around the anode current collector 40 and held in fluid communication with the water supply passage 46, and an arcuate outlet buffer 58b extending around the anode current collector 40 and held in fluid communication with the discharge passage 48.

The water channels 56 have respective ends connected to the arcuate inlet buffer 58a through respective inlet joint channels 60a, and respective other ends connected to the arcuate outlet buffer 58b through respective outlet joint channels 60b. The sum of the distance S1a from the water supply passage 46 to one of the inlet joint channels 60a connected to the respective water channels 56 and the distance S2a from a corresponding one of the outlet joint channels 60b connected to the respective water channels 56 to the discharge passage 48 is equal to the sum of the distance S1b from the water supply passage 46 to another one of the inlet joint channels 60a connected to the respective water channels 56 and the distance S2b from a corresponding one of the outlet joint channels 60b connected to the respective water channels 56 to the discharge passage 48.

The inlet joint channels 60a are oriented at an angle of 90 degrees or greater with respect to respective tangential lines at the ends of the inlet joint channels 60a which are connected to the arcuate inlet buffer 58a. In the first embodiment, for example, the inlet joint channels 60a are oriented at an angle of 90 degrees with respect to the respective tangential lines.

The outlet joint channels 60b are oriented at an angle of 90 degrees or greater with respect to respective tangential lines at the ends of the outlet joint channels 60b which are connected to the arcuate outlet buffer 58b. In the first embodiment, for example, the outlet joint channels 60b are oriented at an angle of 90 degrees with respect to the respective tangential lines.

As shown in FIGS. 3 and 4, the cathode separator 36 has a discharge channel 62 defined in an outer circumferential edge portion thereof in fluid communication with the hydrogen passage 50. The cathode separator 36 also has a hydrogen flow field 64 defined in a surface 36a thereof that faces the membrane electrode assembly 32 and held in fluid communication with the discharge channel 62. The hydrogen flow field 64 extends within a range corresponding to the surface area of the cathode current collector 42, and comprises a plurality of flow field grooves, a plurality of embossed ridges, or the like (see FIGS. 2 and 4).

Seal members 66a, 66b are integrally combined with respective outer circumferential edge portions of the anode separator 34 and the cathode separator 36. The seal members 66a, 66b are made of a seal material, a cushion material, or a gasket material such as EPDM, NBR, fluororubber, silicone rubber, fluorosilicone rubber, butyl rubber, natural rubber, styrene rubber, chloroprene, acrylic rubber, or the like.

As shown in FIGS. 3 and 4, the surface 36a of the cathode separator 36 which faces the membrane electrode assembly 32 has a first seal groove 68a defined therein which extends annularly around the hydrogen flow field 64.

The surface 36a of the cathode separator 36 also has a second seal groove 68b, a third seal groove 68c, and a fourth seal groove 68d defined therein which extend annularly around the water supply passage 46, the discharge passage 48, and the hydrogen passage 50, respectively. A first seal member 70a, a second seal member 70b, a third seal member 70c, and a fourth seal member 70d, each in the form of an O-ring, for example, are disposed respectively in the first seal groove 68a, the second seal groove 68b, the third seal groove 68c, and the fourth seal groove 68d.

The hydrogen flow field 64 and the first seal groove 68a are held in fluid communication with each other through a plurality of (e.g., four) channels (openings) 72. The channels 72 are open at an inner wall surface of the first seal groove 68a that is closer to the hydrogen flow field 64 than the first seal member 70a. The channels 72 keep the hydrogen flow field 64 and the first seal groove 68a in direct fluid communication with each other in bypassing relation to the boundary between the cathode separator 36 and the solid polymer electrolyte membrane 38.

The hydrogen passage 50, which serves as a high-pressure hydrogen passage, and the fourth seal groove 68d are held in fluid communication with each other through one or more channels (openings) 74. The channels 74 are open at an inner wall surface of the fourth seal groove 68d. The channels 74 keep the hydrogen passage 50 and the fourth seal groove 68d in direct fluid communication with each other in bypassing relation to the boundary between the cathode separator 36 and the solid polymer electrolyte membrane 38.

The surface 34a of the anode separator 34 which faces the membrane electrode assembly 32 has a first seal groove 76a defined therein which extends annularly around the water flow field 54 and which is open toward the first seal groove 68a. The surface 34a of the anode separator 34 also has a second seal groove 76b, a third seal groove 76c, and a fourth seal groove 76d defined therein which extend annularly around the water supply passage 46, the discharge passage 48, and the hydrogen passage 50, respectively, and which are open toward the second seal groove 68b, the third seal groove 68c, and the fourth seal groove 68d, respectively.

A first seal member 78a, a second seal member 78b, a third seal member 78c and a fourth seal member 78d, each in the form of an O-ring, for example, are disposed respectively in the first seal groove 76a, the second seal groove 76b, the third seal groove 76c and the fourth seal groove 76d. The fourth seal groove 76d and the hydrogen passage 50 are held in fluid communication with each other through one or more channels (openings) 80. The channels 80 are open at an inner wall surface of the fourth seal groove 76d. The channels 80 keep the hydrogen passage 50 and the fourth seal groove 76d in direct fluid communication with each other in bypassing relation to the boundary between the anode separator 34 and the solid polymer electrolyte membrane 38.

As shown in FIGS. 1 and 2, pipes 82a, 82b, 82c are connected to the end plate 20a in fluid communication with the water supply passage 46, the discharge passage 48, and the hydrogen passage 50, respectively. A back pressure valve or a solenoid-operated valve, not shown, is connected to the pipe 82c for maintaining the pressure of hydrogen generated in the hydrogen passages 50 at a high pressure level.

Operation of the water electrolysis apparatus 10 will be described below.

As shown in FIG. 1, water is supplied from the pipe 82a to the water supply passage 46 in the water electrolysis apparatus 10, and a voltage is applied between the terminals 24a, 24b of the terminal plates 16a, 16b by the power supply 28. As shown in FIG. 3, in each of the unit cells 12, the water is supplied from the water supply passage 46 into the water flow field 54 of the anode separator 34 and moves along the anode current collector 40.

The water is electrolyzed by the anode catalyst layer 40a, generating hydrogen ions, electrons, and oxygen. The hydrogen ions generated by the anodic reaction move through the solid polymer electrolyte membrane 38 to the cathode catalyst layer 42a where they combine with the electrons to produce hydrogen.

The produced hydrogen flows along the hydrogen flow field 64 that is defined between the cathode separator 36 and the cathode current collector 42. The hydrogen is kept under a pressure higher than the pressure in the water supply passage 46, and flows through the hydrogen passage 50. Thus, the hydrogen is extracted from the water electrolysis apparatus 10. The oxygen generated by the anodic reaction and the water that has been used flow in the water flow field 54 and then flow through the discharge passage 48 for being discharged from the water electrolysis apparatus 10.

According to the first embodiment, as shown in FIG. 5, the water flow field 54 includes the water channels 56 extending in the direction indicated by the arrow L1 across the imaginary diametrical straight line L0 which interconnects the water supply passage 46 and the discharge passage 48. The distance S1a from the water supply passage 46 and the distance S2a to the discharge passage 48, which are correlated via a certain common water channel 56, are complementary to each other, so that as the distance S1a is smaller, the distance S2a is longer. Accordingly, the differences between the pressure losses caused by the water channels 56 are reduced.

Particularly, as described above, the sum of the distance S1a from the water supply passage 46 to one of the inlet joint channels 60a connected to the respective water channels 56 and the distance S2a from a corresponding one of the outlet joint channels 60b connected to the respective water channels 56 to the discharge passage 48 is equal to the sum of the distance S1b from the water supply passage 46 to another one of the inlet joint channels 60a connected to the respective water channels 56 and the distance S2b from a corresponding one of the outlet joint channels 60b connected to the respective water channels 56 to the discharge passage 48. Since the pressure losses caused by the water channels 56 are relatively uniformized, the differences between the flow rates in the water channels 56 are effectively reduced.

Furthermore, the inlet joint channels 60a are oriented at an angle of 90 degrees or greater with respect to respective tangential lines at the ends of the inlet joint channels 60a which are connected to the arcuate inlet buffer 58a. Accordingly, the angle of approach at which water is introduced from the arcuate inlet buffer 58a into the inlet joint channels 60a is large enough to reduce pressure losses caused when water is branched into the inlet joint channels 60a.

Particularly, according to the first embodiment, the inlet joint channels 60a are oriented at the angle of 90 degrees with respect to the respective tangential lines. Therefore, the differences between the pressure losses posed on water as it is branched into the inlet joint channels 60a are reduced, thereby making it possible to distribute water uniformly to the water channels 56. Consequently, the entire water flow field 54 can be uniformly and reliably supplied with water for an efficient water electrolyzing process.

Also according to the first embodiment, the outlet joint channels 60b are oriented at an angle of 90 degrees or greater with respect to respective tangential lines at the ends of the outlet joint channels 60b which are connected to the arcuate outlet buffer 58b. Accordingly, the angle of approach at which water is introduced from the outlet joint channels 60b into the arcuate outlet buffer 58b is large enough to reduce pressure losses caused when water is collected into the arcuate outlet buffer 58b.

Particularly, according to the first embodiment, the outlet joint channels 60b are oriented at the angle of 90 degrees with respect to the respective tangential lines. Therefore, the differences between the pressure losses posed on water as it is collected into the outlet joint channels 60b are reduced and do not have a significant adverse effect on water in the inlet joint channels 60a, thereby making it possible to distribute water uniformly from the inlet joint channels 60a into the water channels 56. Consequently, the entire water flow field 54 can be uniformly and reliably supplied with water for an efficient water electrolyzing process.

Figure 6:
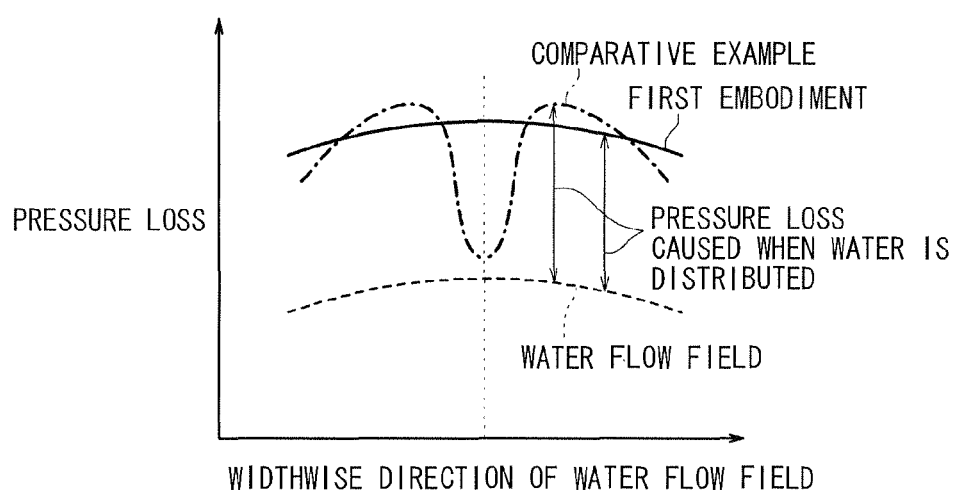
FIG. 6 is a graph illustrative of a pressure loss according to the first embodiment of the present invention and a pressure loss according to a comparative example.

FIG. 6 is a graph illustrative of an overall pressure loss caused by the water flow field 54 according to the first embodiment of the present invention and an overall pressure loss caused by a water flow field according to a comparative example (Japanese Laid-Open Patent Publication No. 09-095791). A review of FIG. 6 indicates that whereas the overall pressure loss caused by the water flow field according to the comparative example varies greatly because the pressure loss drops in a central area of the water flow field near the passages, the overall pressure loss caused by the water flow field 54 according to the first embodiment is relatively uniformized.

Figure 7:
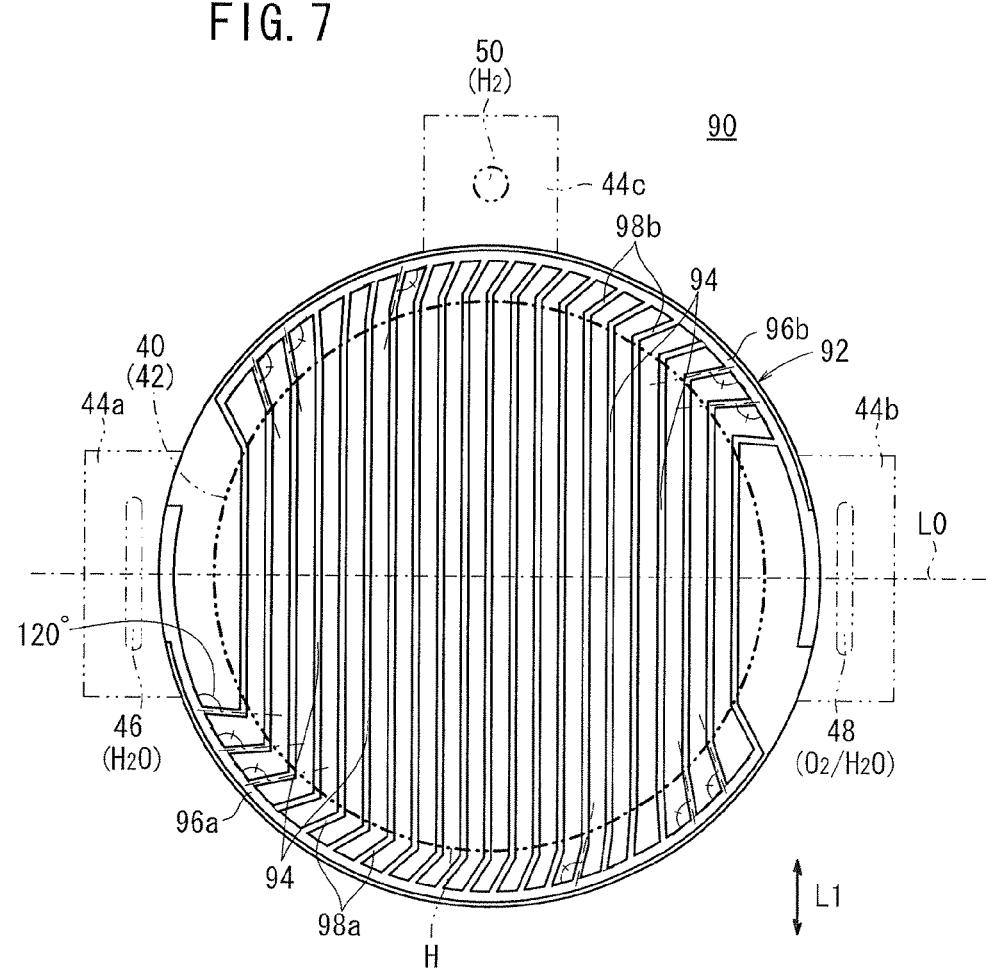
FIG. 7 is a plan view of an anode separator of a water electrolysis apparatus according to a second embodiment of the present invention.

FIG. 7 is a plan view of an anode separator 90 of a water electrolysis apparatus according to a second embodiment of the present invention. Those parts of the anode separator 90 which are identical to those of the anode separator 34 of the water electrolysis apparatus 10 according to the first embodiment are denoted by identical reference characters and will not be described below.

The anode separator 90 has a water flow field 92 including a plurality of water channels 94, an arcuate inlet buffer 96a, and an arcuate outlet buffer 96b. The water channels 94 have respective ends connected to the arcuate inlet buffer 96a through respective inlet joint channels 98a, and respective other ends connected to the arcuate outlet buffer 96b through respective outlet joint channels 98b.

The inlet joint channels 98a are oriented at an angle of 90 degrees or greater with respect to respective tangential lines at the ends of the inlet joint channels 98a which are connected to the arcuate inlet buffer 96a. In the second embodiment, for example, the inlet joint channels 98a are oriented at an angle of 120 degrees with respect to the respective tangential lines.

The outlet joint channels 98b are oriented at an angle of 90 degrees or greater with respect to respective tangential lines at the ends of the outlet joint channels 98b which are connected to the arcuate outlet buffer 96b. In the second embodiment, for example, the outlet joint channels 98b are oriented at an angle of 120 degrees with respect to the respective tangential lines.

According to the second embodiment, as described above, the inlet joint channels 98a are oriented at an angle of 120 degrees with respect to the respective tangential lines, and the outlet joint channels 98b are oriented at an angle of 120 degrees with respect to the respective tangential lines. Therefore, it is possible to distribute water uniformly to the water channels 94, so that the entire water flow field 92 can be uniformly and reliably supplied with water for an efficient water electrolyzing process. The effects similar to those of the first embodiment are obtained.

Figure 8:
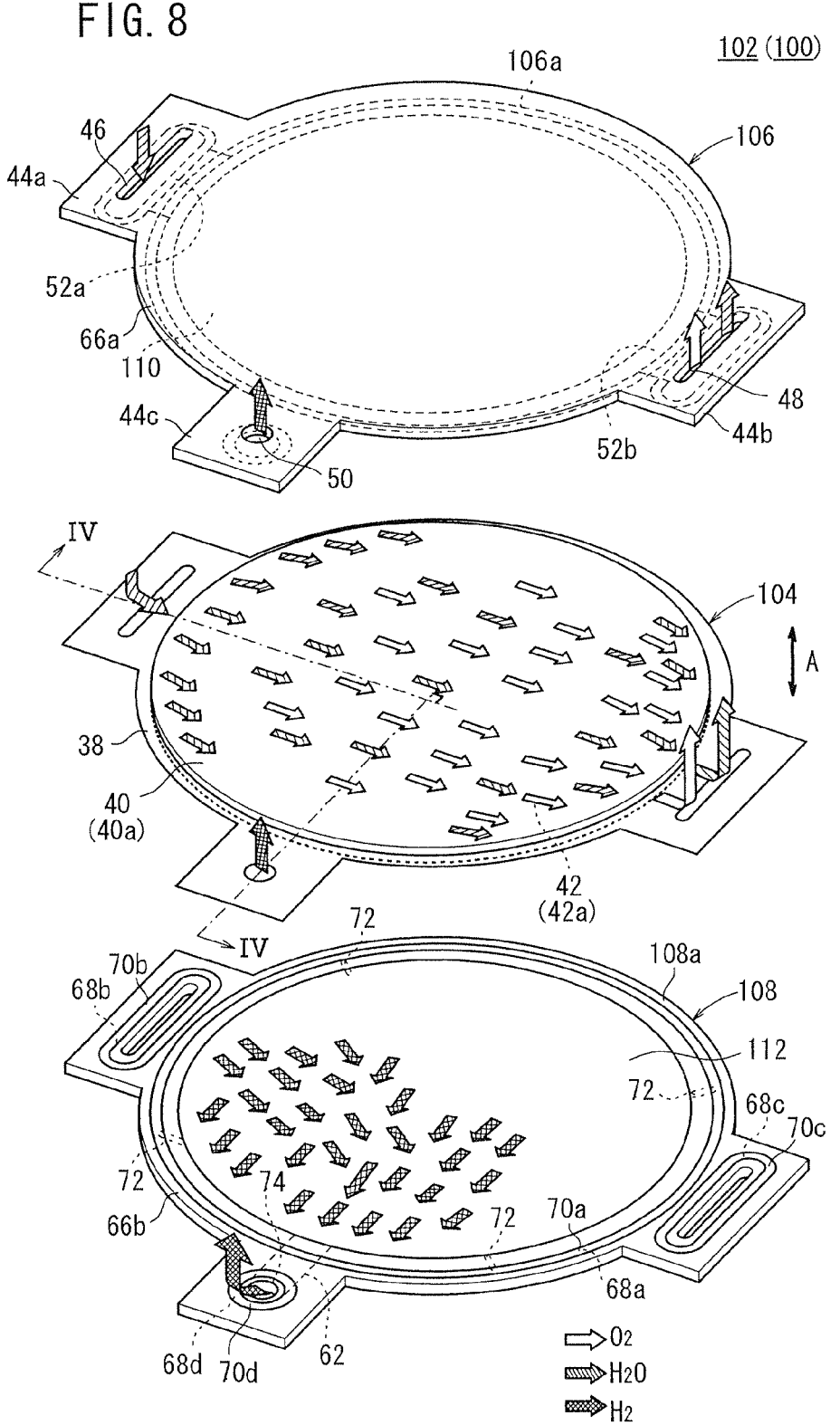
FIG. 8 is an exploded perspective view of a unit cell of a water electrolysis apparatus according to a third embodiment of the present invention.

FIG. 8 is an exploded perspective view of a unit cell 102 of a water electrolysis apparatus 100 according to a third embodiment of the present invention. Those parts of the unit cell 102 which are identical to those of the unit cell 12 of the water electrolysis apparatus 10 according to the first embodiment are denoted by identical reference characters and will not be described below.

As shown in FIG. 8, the unit cell 102 comprises a substantially disk-shaped membrane electrode assembly 104, and an anode separator 106 and a cathode separator 108 which sandwich the membrane electrode assembly 104 therebetween.

Figure 9:
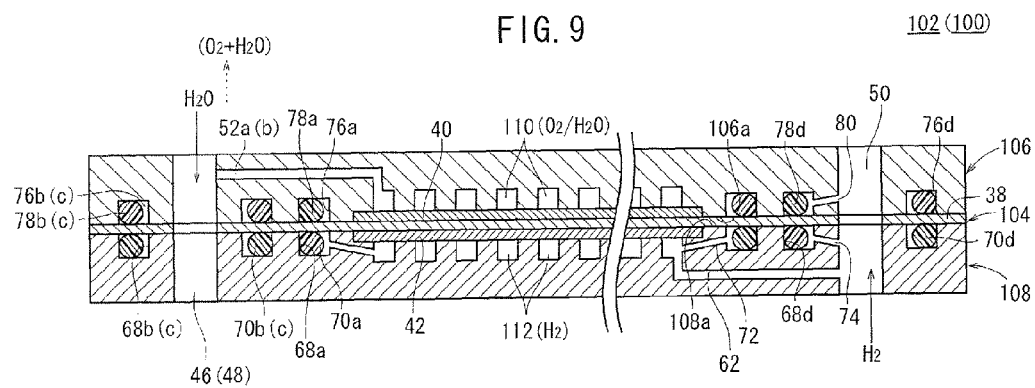
FIG. 9 is a fragmentary cross-sectional view of the unit cell shown in FIG. 8.

As shown in FIGS. 8 and 9, the anode separator 106 has a water flow field 110 defined in a surface 106a thereof which faces the membrane electrode assembly 104 and held in fluid communication with the supply channel 52a and the discharge channel 52b. The cathode separator 108 has a hydrogen flow field 112 defined in a surface 108a thereof that faces the membrane electrode assembly 104 and held in fluid communication with the discharge channel 62.

Figure 10:
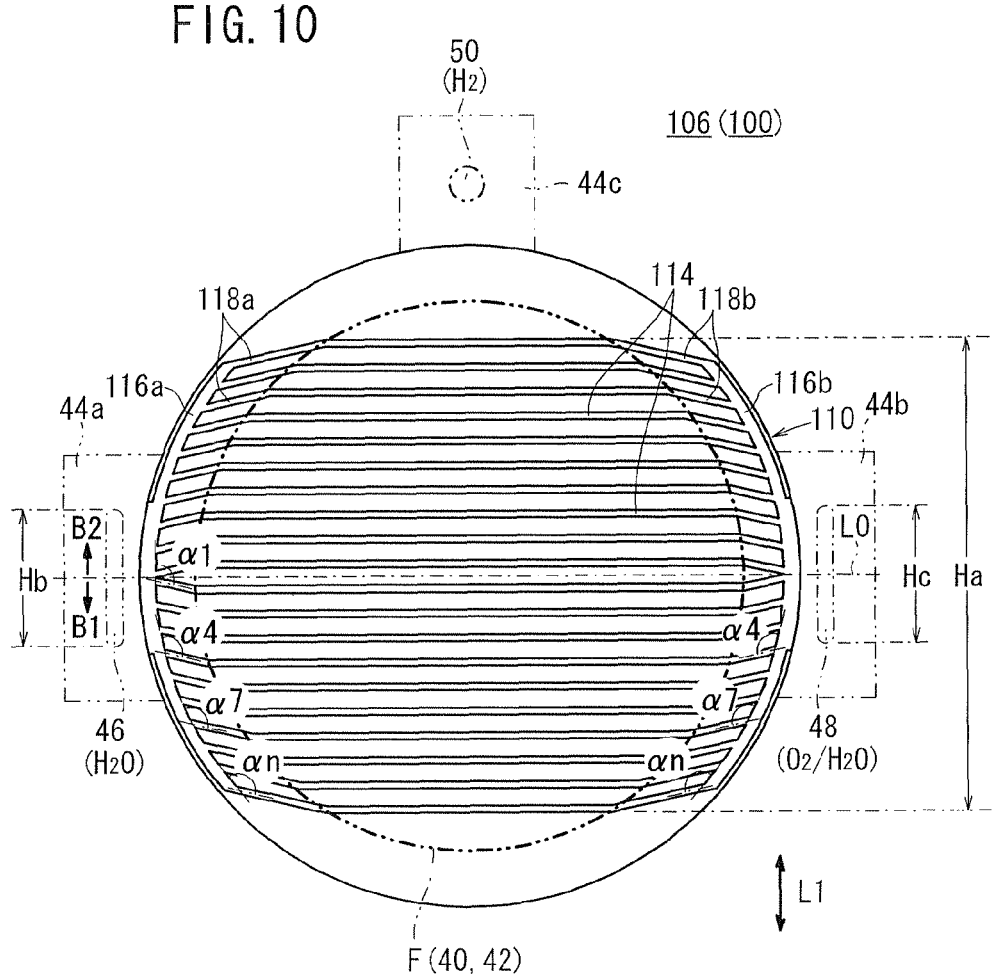
FIG. 10 is a plan view of an anode separator of the unit cell shown in FIG. 8.

As shown in FIG. 10, the water flow field 110 comprises a plurality of water channels 114 extending along the plane of the anode current collector 40 in parallel to the imaginary diametrical straight line L0 which interconnects the water supply passage 46 and the discharge passage 48 and disposed parallel to each other at regular intervals within the plane F of the anode current collector 40, an arcuate inlet buffer 116a extending around the anode current collector 40 and held in fluid communication with the water supply passage 46, and an arcuate outlet buffer 116b extending around the anode current collector 40 and held in fluid communication with the discharge passage 48.

The water channels 114 have respective ends connected to the arcuate inlet buffer 116a through respective bent inlet joint channels 118a, and respective other ends connected to the arcuate outlet buffer 116b through respective bent outlet joint channels 118b.

The inlet joint channels 118a are oriented at respective different angles α1 through αn with respect to respective tangential lines at the ends of the inlet joint channels 118a which are connected to the arcuate inlet buffer 116a. The angles α1 through αn are progressively greater along directions from a central inlet joint channel 118a toward outermost inlet joint channels 118a.

According to the third embodiment, the inlet joint channels 118*a* are inclined at the angles α1 through α*n*, respectively, successively along the directions indicated by the arrows B1, B2 from the imaginary diametrical straight line L0 which extends diametrically across the anode current collector 40. The angles α1 through α*n* are progressively greater along the direction indicated by the arrow B1, i.e., downwardly in FIGS. 10 and 11, and along the direction indicated by the arrow B2, i.e., upwardly in FIGS. 10 and 11. The inlet joint channels 118*a* extend parallel to each other at spaced intervals along the direction indicated by the arrow B1 below the imaginary diametrical straight line L0, and extend parallel to each other at spaced intervals along the direction indicated by the arrow B2 above the imaginary diametrical straight line L0.

The outlet joint channels 118*b* are oriented at respective different angles α1 through α*n* with respect to respective tangential lines at the ends of the outlet joint channels 118*b* which are connected to the arcuate outlet buffer 116*b*. The angles α1 through α*n* are progressively greater along directions from a central outlet joint channel 118*b* toward outermost outlet joint channels 118*b*.

According to the third embodiment, as in the inlet joint channels 118*a*, the outlet joint channels 118*b* are inclined at the angles α1 through α*n*, respectively, successively along the directions indicated by the arrows B1, B2 from the imaginary diametrical straight line L0 which extends diametrically across the anode current collector 40. The angles α1 through α*n* are progressively greater along the direction indicated by the arrow B1, i.e., downwardly in FIGS. 10 and 11, and along the direction indicated by the arrow B2, i.e., upwardly in FIGS. 10 and 11. The outlet joint channels 118*b* extend parallel to each other at spaced intervals along the direction indicated by the arrow B1 below the imaginary diametrical straight line L0, and extend parallel to each other at spaced intervals along the direction indicated by the arrow B2 above the imaginary diametrical straight line L0.

As shown in FIG. 10, the water supply passage 46 has an oblong opening which is of a length Hb that is equal to or greater than Ha/3 where Ha represents the width of a channel area in which the water channels 114 are disposed parallel to each other. Similarly, the discharge passage 48 has an oblong opening which is of a length Hc that is equal to or greater than Ha/3.

As shown in FIGS. 8 and 9, the hydrogen flow field 112 extends within a range corresponding to the surface area of the cathode current collector 42, and comprises a plurality of flow field grooves, a plurality of embossed ridges, or the like.

Figure 11:
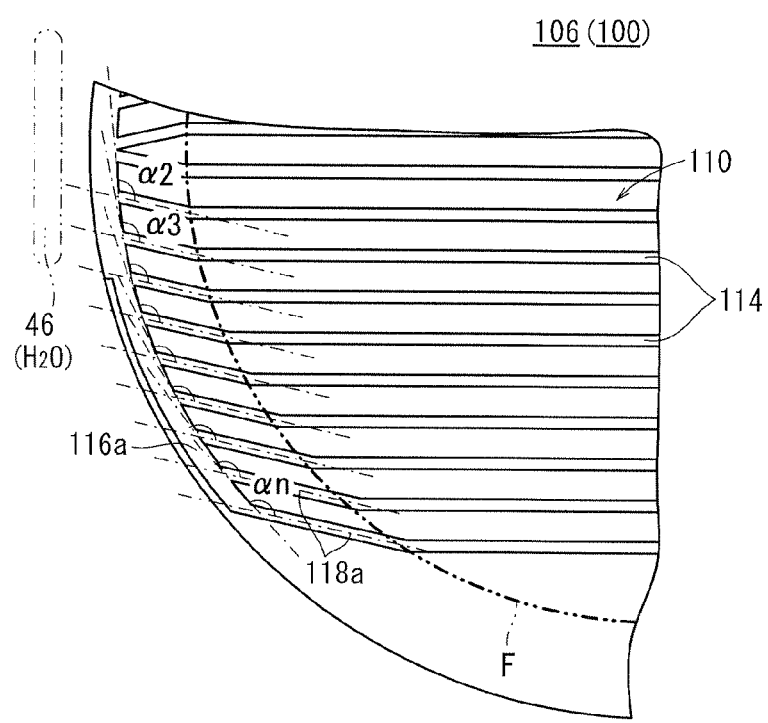
FIG. 11 is an enlarged fragmentary plan view of the anode separator shown in FIG. 10.

According to the third embodiment, as shown in FIGS. 10 and 11, the water flow field 110 has the bent inlet joint channels 118*a* which interconnect the water channels 114 and the arcuate inlet buffer 116*a*. The inlet joint channels 118*a* are oriented at the respective different angles α1 through α*n* with respect to the respective tangential lines at the ends of the inlet joint channels 118*a* which are connected to the arcuate inlet buffer 116*a*, the angles α1 through α*n* being progressively greater from the central inlet joint channel 118*a* toward the outermost inlet joint channels 118*a*.

Therefore, the pressure losses caused when water is distributed from the arcuate inlet buffer 116*a* to the inlet joint channels 118*a* are reduced. Particularly, water is prevented from flowing preferentially into those inlet joint channels 118*a* which are positioned near the water supply passage 46, i.e., near the imaginary diametrical straight line L0.

In particular, the inlet joint channels 118*a* extend parallel to each other at spaced intervals along the direction indicated by the arrow B1 below the imaginary diametrical straight line L0, and extend parallel to each other at spaced intervals along the direction indicated by the arrow B2 above the imaginary diametrical straight line L0. According to the third embodiment, therefore, the differences between the pressure losses caused in the water channels 114 are reduced, thereby making it possible to distribute water uniformly to the water channels 114. Consequently, the entire water flow field 110 can be uniformly and reliably supplied with water for an efficient water electrolyzing process.

According to the third embodiment, furthermore, the oblong opening of the water supply passage 46 is of the length Hb that is equal to or greater than Ha/3 where Ha represents the width of the channel area in which the water channels 114 are disposed parallel to each other. As the water supply passage 46 extends across several central inlet joint channels 118*a*, the pressure losses posed on water distributed to those central inlet joint channels 118*a* are reduced. In other words, water is prevented reliably from concentrating in one inlet joint channel 118*a*.

According to the third embodiment, the water flow field 110 has the bent outlet joint channels 118*b* which interconnect the water channels 114 and the arcuate outlet buffer 116*b*. The outlet joint channels 118*b* are oriented at the respective different angles α1 through α*n* with respect to the respective tangential lines at the ends of the outlet joint channels 118*b* which are connected to the arcuate outlet buffer 116*b*, the angles α1 through α*n* being progressively greater from the central outlet joint channel 118*b* toward the outermost outlet joint channels 118*b*.

Therefore, the pressure losses caused when water is collected from the outlet joint channels 118*b* into the arcuate outlet buffer 116*b* are reduced. The differences between the pressure losses posed on water as it is collected into the outlet buffer 116*b* are reduced and have a reduced effect on water in the inlet joint channels 118*a*, thereby making it possible to distribute water uniformly into the water channels 114. Consequently, the entire water flow field 110 can be uniformly and reliably supplied with water for an efficient water electrolyzing process.

According to the third embodiment, furthermore, the oblong opening of the discharge passage 48 is of the length Hc that is equal to or greater than Ha/3 where Ha represents the width of the channel area in which the water channels 114 are disposed parallel to each other. As the discharge passage 48 extends across several central inlet joint channels 118*a*, the pressure losses posed on water collected from those central inlet joint channels 118*a* are reduced. In other words, water is prevented reliably from concentrating in one inlet joint channel 118*a*.

The water channels 114 are spaced at equal intervals. Consequently, stresses applied to the anode separator 106 by high-pressure hydrogen are uniformized.

In the third embodiment, the inlet joint channels 118*a* extends parallel to each other at spaced intervals along the direction indicated by the arrow B1 below the imaginary diametrical straight line L0, and extend parallel to each other at spaced intervals along the direction indicated by the arrow B2 above the imaginary diametrical straight line L0. However, the arrangement of the inlet joint channels 118*a* is not limited in this respect. For further reducing the pressure losses posed on water as it is distributed to inlet joint channels 118*a*, in addition to the arrangement at respective different angles α1 through α*n*, the inlet joint channels 118*a* may extend out of parallel to each other. Similarly, the outlet joint channels 118*b* may extend out of parallel to each other.

Figure 12:
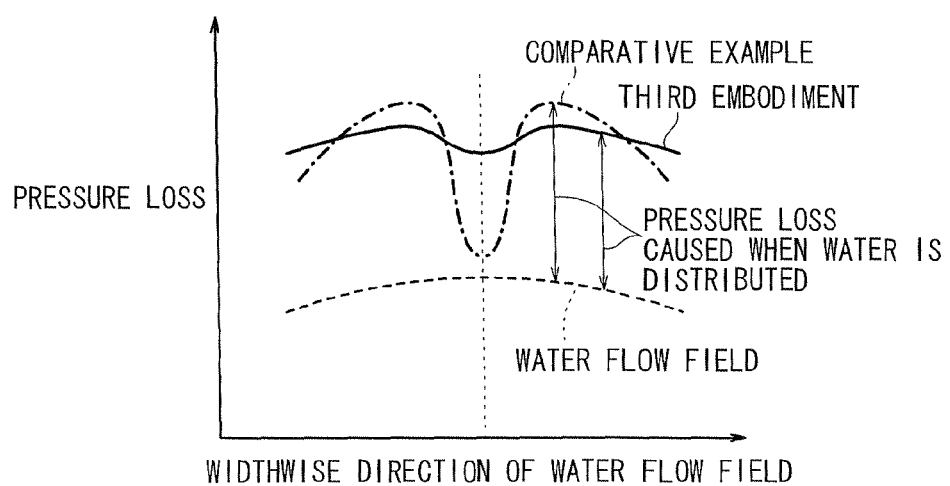
FIG. 12 is a graph illustrative of a pressure loss according to the third embodiment of the present invention and the pressure loss according to the comparative example.
Figure 13:
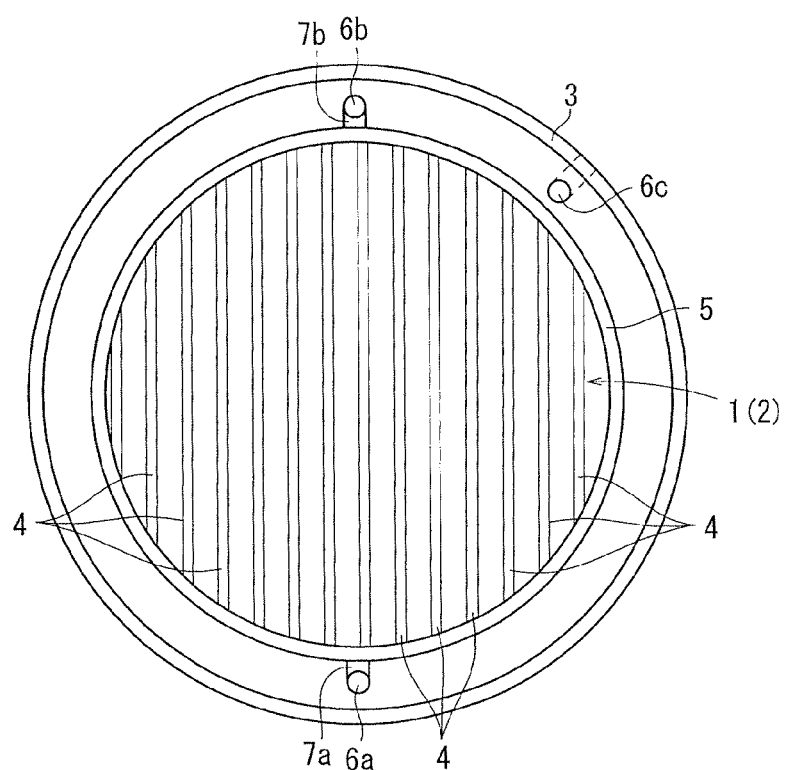
FIG. 13 is a plan view of a water electrolysis apparatus disclosed in Japanese Laid-Open Patent Publication No. 09-095791.

FIG. 12 shows an overall pressure loss caused by the water flow field 110 according to the third embodiment and the overall pressure loss caused by the water flow field according to the comparative example (Japanese Laid-Open Patent Publication No. 09-095791). It can be seen from FIG. 12 that the overall pressure loss caused by the water flow field 110 according to the third embodiment is substantially uniformized.

Although certain preferred embodiments of the present invention have been shown and described in detail, it should be understood that various changes and modifications may be made therein without departing from the scope of the appended claims.

What is claimed is:

1. A water electrolysis apparatus comprising:
   an electrolyte membrane;
   a pair of circular current collectors disposed respectively on opposite sides of the electrolyte membrane;
   a pair of separators stacked respectively on the circular current collectors;
   wherein a water flow field for supplying water is defined between one of the circular current collectors and one of the separators and a hydrogen flow field for producing hydrogen through electrolysis of the water is defined between the other circular current collector and the other separator;
   a water supply passage extending along a stacked direction in which the separators are stacked, for supplying the water to the water flow field; and
   a discharge passage extending along the stacked direction, for discharging a remaining amount of the water from the water flow field;
   wherein the water flow field includes:
   a plurality of water channels extending along a plane of the circular current collector across an imaginary straight line which interconnects the water supply passage and the discharge passage, and disposed parallel to each other in the plane of the circular current collector;
   an arcuate inlet buffer extending around the circular current collector and held in fluid communication with the water supply passage; and
   a plurality of inlet joint channels interconnecting the water channels and the arcuate inlet buffer;
   wherein the inlet joint channels are oriented at an angle of 90 degrees or greater with respect to respective tangential lines at the ends of the inlet joint channels which are connected to the arcuate inlet buffer.

2. A water electrolysis apparatus according to claim 1, wherein the inlet joint channels are oriented at the same angle with respect to the respective tangential lines at the ends of the inlet joint channels which are connected to the arcuate inlet buffer.

3. A water electrolysis apparatus according to claim 1, wherein the water flow field comprises:
   an arcuate outlet buffer extending around the circular current collector and held in fluid communication with the discharge passage; and
   a plurality of outlet joint channels interconnecting the water channels and the arcuate outlet buffer;
   wherein the outlet joint channels are oriented at an angle of 90 degrees or greater with respect to respective tangential lines at the ends of the outlet joint channels which are connected to the arcuate outlet buffer.

4. A water electrolysis apparatus according to claim 3, wherein the outlet joint channels are oriented at the same angle with respect to the respective tangential lines at the ends of the outlet joint channels which are connected to the arcuate outlet buffer.

5. A water electrolysis apparatus according to claim 3, wherein the sum of the distance from the water supply passage to one of the inlet joint channels connected to the respective water channels and the distance from a corresponding one of the outlet joint channels connected to the respective water channels to the discharge passage is equal to the sum of the distance from the water supply passage to any other one of the inlet joint channels connected to the respective water channels and the distance from a corresponding one of the outlet joint channels connected to the respective water channels to the discharge passage.

6. A water electrolysis apparatus comprising:
   an electrolyte membrane;
   a pair of circular current collectors disposed respectively on opposite sides of the electrolyte membrane;
   a pair of separators stacked respectively on the circular current collectors;
   wherein a water flow field for supplying water is defined between one of the circular current collectors and one of the separators and a hydrogen flow field for producing hydrogen through electrolysis of the water is defined between the other circular current collector and the other separator;
   a water supply passage extending along a stacked direction in which the separators are stacked, for supplying the water to the water flow field; and
   a discharge passage extending along the stacked direction, for discharging a remaining amount of the water from the water flow field;
   wherein the water flow field includes:
   a plurality of water channels extending along a plane of the circular current collector across an imaginary straight line which interconnects the water supply passage and the discharge passage, and disposed parallel to each other in the plane of the circular current collector;
   an arcuate inlet buffer extending around the circular current collector and held in fluid communication with the water supply passage; and
   a plurality of bent inlet joint channels interconnecting the water channels and the arcuate inlet buffer;
   wherein the inlet joint channels are oriented at respective different angles with respect to respective tangential lines at the ends of the inlet joint channels which are connected to the arcuate inlet buffer, the different angles being progressively greater along directions from a central one of the inlet joint channels toward outermost ones of the inlet joint channels.

7. A water electrolysis apparatus according to claim 6, wherein the water supply passage has an oblong opening which is of a length Hb that is equal to or greater than Ha/3 where Ha represents the width of a channel area in which the water channels are disposed parallel to each other.

8. A water electrolysis apparatus according to claim 6, wherein the water flow field comprises:
   an arcuate outlet buffer extending around the circular current collector and held in fluid communication with the discharge passage; and
   a plurality of bent outlet joint channels interconnecting the water channels and the arcuate outlet buffer;
   wherein the outlet joint channels are oriented at respective different angles with respect to respective tangential lines at the ends of the outlet joint channels which are connected to the arcuate outlet buffer, the different angles being progressively greater along directions from a central one of the outlet joint channels toward outermost ones of the outlet joint channels.

9. A water electrolysis apparatus according to claim 8, wherein the discharge passage has an oblong opening which is of a length Hc that is equal to or greater than Ha/3 where Ha represents the width of a channel area in which the water channels are disposed parallel to each other.

* * * * *